United States Patent Office 2,876,809
Patented Mar. 10, 1959

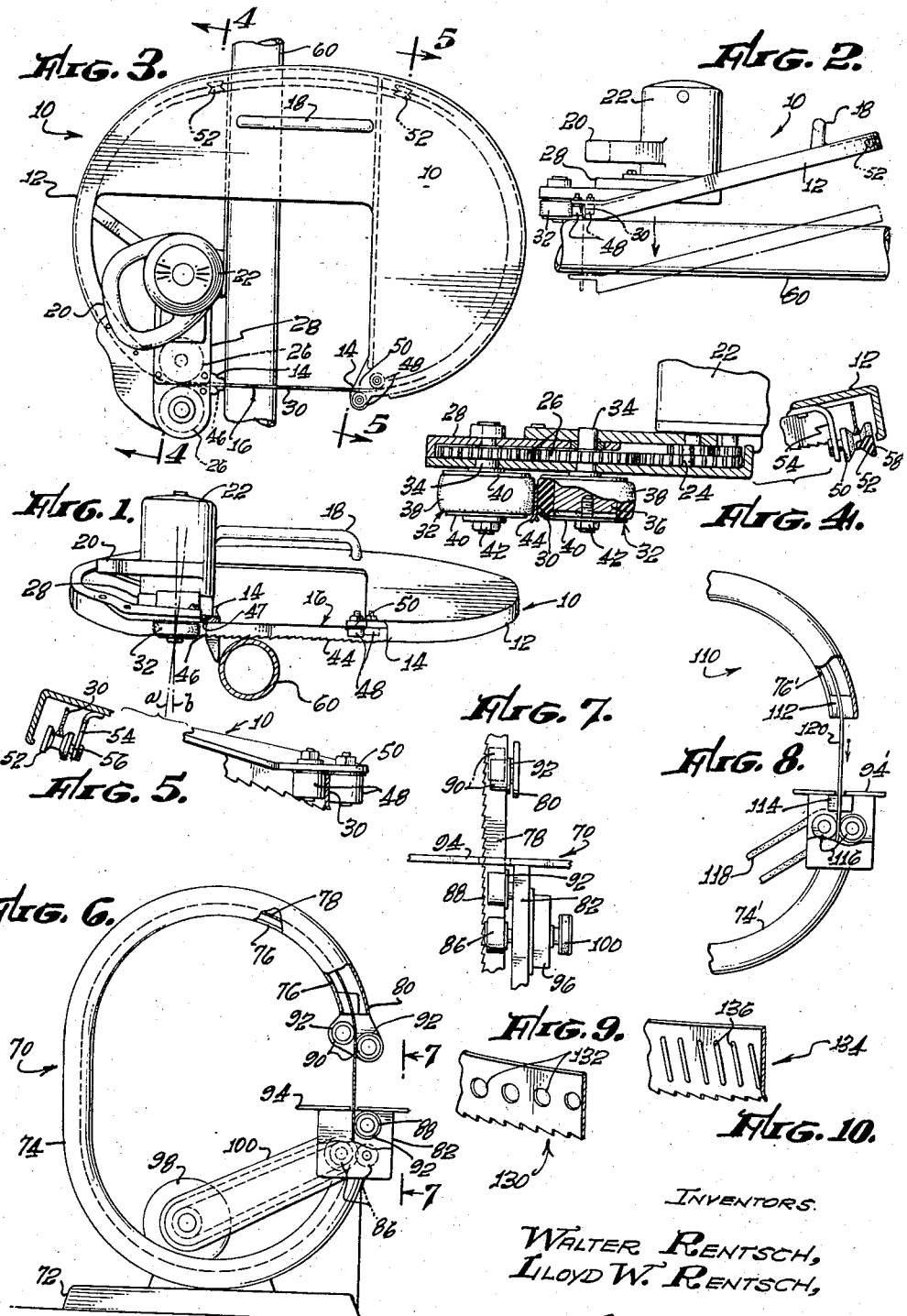

2,876,809

LOW BLADE-TENSION BAND SAW CONSTRUCTIONS

Walter Rentsch, Daly City, and Lloyd W. Rentsch, North Hollywood, Calif.

Application June 29, 1956, Serial No. 595,002

18 Claims. (Cl. 143—21)

This invention relates to new and improved band saw constructions. This application is a continuation in part of the co-pending application Serial No. 541,762, filed October 20, 1955, and abandoned.

The conventional band saw marketed today is a comparatively large, bulky structure in which a band saw blade is held under tension between either two or three wheels. Most individuals consider it difficult to replace the blade in conventional band saws of this category because of the necessity of adjusting the blade tension in such a manner that it "tracks" in the proper manner so as to remain upon the wheels during operation. An object of this invention is to provide new and improved band saws in which the blade may be easily replaced.

A more important objective of the invention is, however, to provide band saw constructions eliminating many of the disadvantages of more conventional band saws, as briefly indicated in the preceding paragraph. In this connection, the invention encompasses band saws in which no large wheels are utilized to hold the band saw blade and in which, instead, the blade, except during the cutting run, is not under any material amount of tension. By dispensing with large wheels as are found in conventional band saws, a number of important commercial advantages are obtained. The constructions of this invention are comparatively light in weight, and do not occupy a comparatively large volume of space. Further, they are very simple to construct and easy to maintain and operate. Because of the precise constructions involved, they are also very reliable, and can be manufactured sufficiently inexpensively so as to enable many individuals to purchase them. In effect, it is considered that constructions of this invention will open up new markets in the home workshops and other related fields.

It is possible to construct, in accordance with the teachings of this invention, various cut-off saws of a band saw category which can be easily and conveniently used for cutting lengths of pipe and the like. Such cut-off saws of the present invention possess a number of distinct advantages, such advantages being outside of the more basic advantages of a general nature indicated in the preceding discussion. Conventional band saw type cut-off saws normally hold a blade entirely under tension between several large rollers and twist this blade adjacent to its cutting run by means of guides. Such twisting creates abnormal tensions in the blade which tend to shorten its effective life during operation. With the present invention it is possible to utilize various support means as will be hereinafter indicated so as to move the blade during its operation to a curved path or shape so as to create a cut-off saw construction.

Further advantages of the present invention and many other specific objects of it will be fully apparent to those skilled in the art to which this invention pertains from a consideration of the remainder of this specification including the appended claims and the accompanying drawing in which:

Fig. 1 is a front elevational view, partially in section, showing a cut-off type of band saw construction of the present invention;

Fig. 2 is a side elevational view of the saw shown in Fig. 1;

Fig. 3 is a top elevational view of the saw shown in Fig. 1;

Fig. 4 is a cross sectional view taken at line 4—4 of Fig. 3;

Fig. 5 is a cross sectional view taken at line 5—5 of Fig. 3;

Fig. 6 is a side elevational view, partially in section, of a modified band saw construction of this invention;

Fig. 7 is a front elevational view of the saw shown in Fig. 6, this view being partially in section;

Fig. 8 is a partial side elevational view of another modified band saw construction of this invention, this view being partially in section; and Figs. 9 and 10 are isometric views of part of specially developed band saw blades which may be employed with the present invention.

In all figures of the drawing, like numerals are used to designate like parts wherever convenient for purposes of illustration and explanation. It is to be understood that the present invention is not limited to the precise structures illustrated and described in this specification since a number of modifications can be made in these structures without departing from the essential features of the present invention. As an example of this, the relative sizes and shapes of certain of the parts can be modified without the use of inventive faculty. Further, various features in the various forms of the invention illustrated can be interchanged with the features performing the equivalent function in other forms of the invention.

As an aid to understanding the invention it may be stated in essentially summary form that it is concerned with band saws, or band saw constructions, each of which includes a support member or frame having adjacent ends disposed from one another so as to define a cutting path; a band saw blade located within said support frame so as to travel across said cutting path; drive roller means mounted on this support frame adjacent to one of said ends; and guide means mounted on said ends, said drive roller means and said guide means engaging said band saw blade in such a manner that as said drive roller means are actuated said band saw blade is pulled under tension through said cutting path. Obviously a summary of this category does not disclose all of the actual details of the invention. The essential features of it which are considered to be inventive in character are set forth in essentially summary form in the claims at the end of this application.

In Figs. 1, 2 and 3 of the drawings there is shown a cut-off type of band saw 10 of the present invention which includes a support member or frame 12 having adjacent ends 14 located so as to be spaced from one another so as to define an entrance to a cutting path 16. The frame 12 may be formed out of any convenient material such as aluminum or the like and is preferably reinforced as desired by various braces etc. In addition, this frame serves as a housing. A handle 18 may be mounted upon it so as to aid in maneuvering the saw 10.

Another handle 20 is, with this construction, attached to a small electric motor 22 which is mounted upon the frame 12 adjacent to one of the ends 14. The motor 22 is used so as to drive a gear train 24, serving to transmit power to co-acting gears 26 mounted within a gear housing 28. It will be specifically noted from Fig. 4 of the drawings that the gears 26 with this construction rotate in opposite directions, preferably at the same speed so that a conventional band saw blade 30 may be pulled between drive rollers 32. The drive rollers 32 are secured to shafts 34 connected to the gears 26 and projecting from the gear housing 28.

Each of these drive rollers 32 is formed so as to include a center cylinder 36 surrounded by an elastomeric tire 38. These tires are preferably formed out of rubber or a rubber-like composition so as to resiliently engage the blade 30. Normally the tires 38 are held under compression upon the cylinders 36 by being secured between washers 40 attached to the sides of the center cylinders 36. A preferred construction of this category is as illustrated in Fig. 4 of the drawings where one of the washers 40 on each of the drive rollers 32 is held in place by means of a bolt 42 in such a manner that this bolt may be adjusted so as to adjust the tension upon a corresponding tire 38. For satisfactory operation the tension on the tires 38 should be approximately equal. A differential in the tension on these tires will affect the course of travel of the blade 30. If desired, the tension on the blade may be controlled by spring means bracing both the rollers 32 against one another, or bracing one of the rollers against the other.

The blade 30 in the saw 10 travels in what may be considered a twisted, curved or partially elliptical path through the frame 12 so as to always have a cutting edge 44 extending from the drive rollers 32 and so as to always travel a straight path between the ends 14. In order to aid the blade 30 in maintaining this configuration, a small bushing 46 is mounted upon one of the ends 14 adjacent to the drive rollers 32 so that the blade 30 passes through a guide slot 47 (Fig. 1) in this bushing. This slot is straight, and is aligned with the path of the blade 30 between the ends 14. The back edge of the blade 30 engages the back edge of this slot, and it is provided with an enlarged end so as not to affect the cutting edge 44. Upon the end 14 on the other side of the cutting path 16 there are located two small guide rollers 48. These rollers may be formed out of metal, or may be provided with elastomeric surfaces as indicated in discussing the drive rollers 32; they are preferably each provided with thrust flanges 50 engaging the back edge of the blade 30, although only one means for absorbing thrust is required. Other conventional means than these flanges can be used. Thus, the cutting edge 44 of the blade 30 always projects from the guide rollers 48 so that these guide rollers do not engage the blade 30 in any manner which would tend to dull it.

It should be specifically noted that the guide rollers 48 are offset with respect to one another so that the outer of the two guide rollers is located closer to the cutting path 16 than the other of these guide rollers. This construction is necessary in order for these two guide rollers to straighten the blade 30 as it travels across the cutting path 16 during use. The angular and lateral torque or "twist" of the blade 30 is removed from it by these guide means. If desired the rollers 48 can be manufactured of smaller diameter than shown so as to only hit against portion of the blade 30 so as to straighten its travel during its cutting run. The saw 10 is employed in such a manner that the motor 22 pulls the blade 30 through the use of the drive rollers 32 across this cutting path towards these drive rollers. Thus, the blade 30 is under some tension between the drive rollers 32 and the guide rollers 48 serving to straighten the blade 30.

Preferably the drive rollers 32 are positioned with respect to one another with their axes on the same plane perpendicular to the blade 30. By adjusting the position of the axes of these drive rollers in planes parallel to the blade 30 it is possible to effect the travel of the blade 30 so that this blade "rides up" on the drive rollers or, by adjusting the position of these axes, the opposite direction out of the drive rollers. When the position of these axes are adjusted so as to point slightly towards the top of the cutting path 16 the blade 30 tends to "ride up" and remains against the guide means. This preferred construction is shown by the lines $a$ and $b$ of Fig. 1 in the drawing. Here the line $a$ indicates an axis perpendicular to the cutting run or path 16. The line $b$ indicates how the axes of the rollers 32 are at a slight angle to the line $a$ so as to be inclined toward the back side of the blade 30 in the cutting path 16. The axes of the drive rollers 32 are in planes which are parallel to one another.

The blade 30 within the frame 12 is essentially in a "free condition" in which it is substantially free to travel its own path, and is not held under any material amount of tension. While the blade is in this relaxed state, two small support rollers 52 are adequate to distort this blade out of its normal plane into the particular curved, twisted path desirable with a cut-off saw. The support rollers 52 are preferably mounted upon brackets 54, by means of shafts 56; they preferably are both formed out of an elastomeric material 58 such as indicated in discussing tires 38. It is noted that the support rollers 52 engage the cutting edge 44 of the blade 30. By virtue of the material from which they are constructed and by virtue of the fact that they are free to rotate during the operation of the saw 10, they are not normally damaged to any noticeable extent by the cutting edge 44 of the blade 30 and this cutting edge is not dulled by contact with them.

The use of the saw 10 should be comparatively obvious to anyone familiar with cut-off saws. An individual by turning the motor 22 on and engaging the handles 18 to 20 can locate the saw 10 over a long length of pipe 60 or any other similar material, and by lowering the saw can cut this pipe in any desired location in a direction at right angles to the axis of it. The saw 10 can, of course, be used for other more conventional cutting operations such as are found in a home workshop.

For such home use it is possible to simplify and alter the construction of the saw 10 to a slight extent. In Fig. 6 of the drawings there is shown a modified hand saw of the present invention which differs from the saw 10 in several respects. This saw 70 includes a base 72 having a rigid frame 74 of essentially tubular construction extending therefrom. This frame has a slot 76 formed therein so as to facilitate the insertion of a band saw blade 78; it also has projecting ends 80 and 82 which are spaced from one another so as to constitute an opening or cutting path 84.

The blade 78 is held in a desired straight configuration while traversing between the ends 80 and 82 by means of drive rollers 86 similar to the drive rollers 32 previously described, by means of a guide roller 88 mounted upon the end 82 immediately adjacent to and above the drive rollers 86, and by means of other guide rollers 90 mounted upon the end 80 so as to engage the blade 78 in order to straighten this blade during this movement. The other guide rollers 90 are substantially identical to the guide rollers 48 previously described and are provided with thrust flanges 92 engaging the smooth or back end of the blade 78. A similar thrust flange 92 is provided uopn the guide roller 88. A small cutting table 94 of conventional construction is mounted upon the end 82 immediately above the guide roller 88. The drive rollers 86 in the saw 70 are driven in a similar manner to the drive rollers 32 by means of gears (not shown) in a gear box 96. This gear box is driven through the use of a motor 98 by means of a conventional V-belt drive 100. The axes of all of the drive and guide rollers in this embodiment of the invention are preferably parallel to one another.

The operation of the saw 70 may be considered to be essentially similar to the operation of the saw 10. The blade 78 is under tension between the drive rollers 86 in this construction and the guide rollers 90. The blade 78 during its course of travel from the drive rollers 86 to the guide rollers 90, is not under any material amount of tension and, hence, assumes what may be considered a "free path" where it is free to adopt a configuration within one plane depending upon primarily the specific spacing and location of the rollers 86, 88 and 90. With this construction, no auxiliary means are normally required in order to support the blade 78 during the principal portion of its travel.

If desired, the saw 70 may be modified slightly so as to create another saw 110 which is identical to the saw 70 except as specifically indicated. The saw 110 utilizes, instead of guide rollers 90, a small bushing 112 (Figure 8) similar to the bushing 46 previously described. It also utilizes, instead of the guide roller 88, another bushing 114. The drive rollers 116 in the saw 110 are not adapted to both be driven as in the constructions previously describer, but, instead, power is supplied to only one of these drive rollers 116, by means of a V-belt drive 118. The other of these drive rollers is mounted so as to rotate freely. The drive rollers 116 are preferably of the same construction as the drive rollers 32 and are mounted so as to resiliently bear against a band saw blade 120 so that when one of the drive rollers is turned the other one is automatically turned. If desired, either of the drive wheels may be resiliently biased by means of a spring against the driven drive roller. However, the tension of the tires on these rollers is normally sufficient to establish sufficient tension against the band saw blade 120.

In any of the constructions described or indicated in this specification, an important feature is the fact that drive roller means are employed so as to resiliently engage and pull a band saw blade. When guide rollers are formed as discussed so as to present an elastomeric surface it is possible to increase the friction so as to minimize the possibility of slippage between these drive rollers and the blade by any number of expedients. One of these is to form a roughened exterior surface upon the blade used. This may be accomplished in several ways. In Fig. 9 there is shown a portion of a band saw blade 130 having holes 132 formed therein. In Fig. 10 there is shown a portion of a band saw blade 134 having ridges 136 formed therein so as to project from opposite sides of the blade itself. These ridges are preferably formed as shown so as to slope at an angle. With both of these types of blade constructions, the friction between an elastomeric surface and the blade is materially increased. Further, both the holes and/or the ridges shown are very effective in tending to carry sawdust and the like from a cut being made so as to prevent binding.

It is to be understood that the present invention can be modified in still further ways than indicated. If desired, various thumb screws and the like can be formed on any of the frames described so as to exert pressure on various portions of the blades during their travel throughout these frames so as to tend to compensate for an erroneous blade size or the like in order to make sure that the blades travel in a desired path. Such means merely touch against the sides of the blades so as to control the path through which they travel. Further, if desired, in any of the constructions shown, support rollers similar to the support rollers 52 may be utilized. In other constructions than a cut off type of band saw these support rollers need not be disposed at an angle as with the saw 10.

Further, it is possible to modify the various guide means utilized so as to have any combination of guide rollers or bushings in any specific saw falling within the scope of this invention. Such guide means may even, on occasion, be dispensed with adjacent to the drive rollers used, and such drive rollers may be offset at an angle with respect to one another so as to accomplish the same function. This is not normally preferred, however, because of the problem of obtaining proper tension upon the blade between the two drive rollers.

Because of the nature of this invention and its scope, as indicated in the preceding discussion, it is considered as being limited only by the appended claims, and these claims, in turn are to be considered as being limited only by the true nature of this invention as described in the specification.

We claim:

1. A band saw of the class described which includes: a C-shaped support frame having adjacent ends disposed from one another so as to define a cutting path between said ends; a continuous, flexible band saw blade positioned with respect to said frame so as to extend across said cutting path, said blade having outside and back sides, a cutting edge and a back edge; guide means mounted on one of said ends, said guide means engaging the sides of said blade so as to change the path of said blade from a smooth curve to a straight line at the beginning of said cutting path, said cutting edge of said blade extending from said guide means; two drive rollers mounted on the other of said ends, said drive rollers resiliently engaging opposed sides of said blade, said drive rollers having parallel axes inclined toward the back side of said band saw blade in said cutting path so as to cause said blade to remain within said guide means as said drive rollers are rotated in order to pull said blade from said guide means across said cutting path.

2. A band saw as defined in claim 1 wherein said guide means comprise a bushing, said bushing having a curved slot in which the curvature corresponds to the curvature of said frame formed therein, said blade fitting within said slot.

3. A band saw as defined in claim 1 wherein said guide means comprise guide rollers, said guide rollers being offset with respect to one another so that the one of said guide rollers is located on the outside of said blade and is located closer to said cutting path than the other of said guide rollers, and the other of said guide rollers is located on the other side of said blade, said rollers engaging the sides of said blade.

4. A band saw as defined in claim 1 wherein each of said drive rollers has an elastomeric surface resiliently engaging a side of said blade.

5. A band saw as defined in claim 1 wherein the sides of said band saw blade are provided with a means on the surface of said blade for increasing the friction between said drive rollers and said blade.

6. A band saw as defined in claim 1 including support rollers rotatably mounted on said frame away from said cutting path, said support rollers engaging the cutting edge of said blade so as to cause said blade to travel in a curved, twisted path so that the cutting run of said band saw is at an oblique angle and said band saw is capable of being used as a cut off type of saw.

7. A band saw of the class described which includes: a C-shaped support frame having adjacent ends disposed from one another so as to define a cutting path between said ends; a continuous, flexible band saw blade positioned with respect to said frame so as to extend across said cutting path, said blade having outside and back sides, a cutting edge and a back edge; guide means mounted on one of said ends, said guide means engaging the sides of said blade so as to change the path of said blade from a smooth curve to a straight line at the beginning of said cutting path without changing the tension of said blade, said cutting edge of said blade extending from said guide means; and two drive rollers mounted on the other of said ends, said drive rollers resiliently engaging opposed sides of said blade, whereby as said drive rollers are rotated said blade is pulled across said cutting path from said guide means.

8. A band saw as defined in claim 7 wherein said guide means comprise a bushing, said bushing having a curved slot in which the curvature corresponds to the curvature of said frame formed therein, said blade fitting within said slot.

9. A band saw as defined in claim 7 wherein said guide means comprise guide rollers, said guide rollers being offset with respect to one another so that the one of said guide rollers is located on the outside of said blade and is located closer to said cutting path than the other of said guide rollers, and the other of said guide rollers is located on the other side of said blade, said rollers engaging the sides of said blade.

10. A band saw as defined in claim 7 wherein each of said drive rollers has an elastomeric surface resiliently engaging a side of said blade.

11. A band saw as defined in claim 7 wherein the sides of said band saw blade are provided with a means on the surface of said blade for increasing the friction between said drive rollers and said blade.

12. A band saw as defined in claim 7 including support rollers rotatably mounted on said frame away from said cutting path, said support rollers engaging the cutting edge of said blade so as to cause said blade to travel in a curved, twisted path so that the cutting run of said band saw is at an oblique angle, and said blade is capable of being used as a cut off type of saw.

13. A band saw of the class described which includes: a C-shaped support frame having adjacent ends disposed from one another so as to define a cutting path between said ends; a continuous, flexible band saw blade positioned with respect to said frame so as to extend across said cutting path, said blade having outside and back sides, a cutting edge and a back edge; guide means mounted on one of said ends, said guide means engaging the sides of said blade so as to change the path of said blade from a smooth curve to a straight line at the beginning of said cutting path without changing the tension of said blade, said cutting edge of said blade extending from said guide means; and two drive rollers resiliently engaging opposed sides of said blade, said drive rollers having parallel axes inclined toward the back side of said band saw blade in said cutting path so as to cause said blade to remain within said guide means as said drive rollers are rotated in order to pull said blade from said guide means across said cutting path.

14. A band saw as defined in claim 13 wherein said guide means comprise a bushing, said bushing having a curved slot in which the curvature corresponds to the curvature of said frame formed therein, said blade fitting within said slot.

15. A band saw as defined in claim 13 wherein said guide means comprise guide rollers, said guide rollers being offset with respect to one another so that the one of said guide rollers is located on the outside of said blade and is located closer to said cutting path than the other of said guide rollers, and the other of said guide rollers is located on the other side of said blade, said rollers engaging the sides of said blade.

16. A band saw as defined in claim 13 wherein each of said drive rollers has an elastomeric surface resiliently engaging a side of said blade.

17. A band saw as defined in claim 13 wherein the sides of said band saw blade are provided with a means on the surface of said blade for increasing the friction between said drive rollers and said blade.

18. A band saw as defined in claim 13 including support rollers rotatably mounted on said frame away from said cutting path, said support rollers engaging the cutting edge of said blade so as to cause said blade to travel in a curved, twisted path so that the cutting run of said band saw is at an oblique angle, and said band saw is capable of being used as a cut off type of saw.

References Cited in the file of this patent

UNITED STATES PATENTS

| 8,056 | Hedge | Apr. 22, 1851 |
| 499,162 | Emerson | June 6, 1893 |
| 822,056 | Knox | May 29, 1906 |
| 931,894 | Spayd | Aug. 24, 1909 |
| 935,395 | Napier | Sept. 28, 1909 |
| 1,676,071 | Bolinder | July 3, 1928 |
| 2,392,486 | Larsen | Jan. 8, 1946 |
| 2,596,081 | Sacray | May 6, 1952 |
| 2,711,761 | Grants | June 28, 1955 |
| 2,751,941 | Smith | June 26, 1956 |

FOREIGN PATENTS

| 14,026 | Great Britain | Mar. 20, 1852 |
| 608,754 | Germany | Jan. 31, 1935 |